United States Patent Office

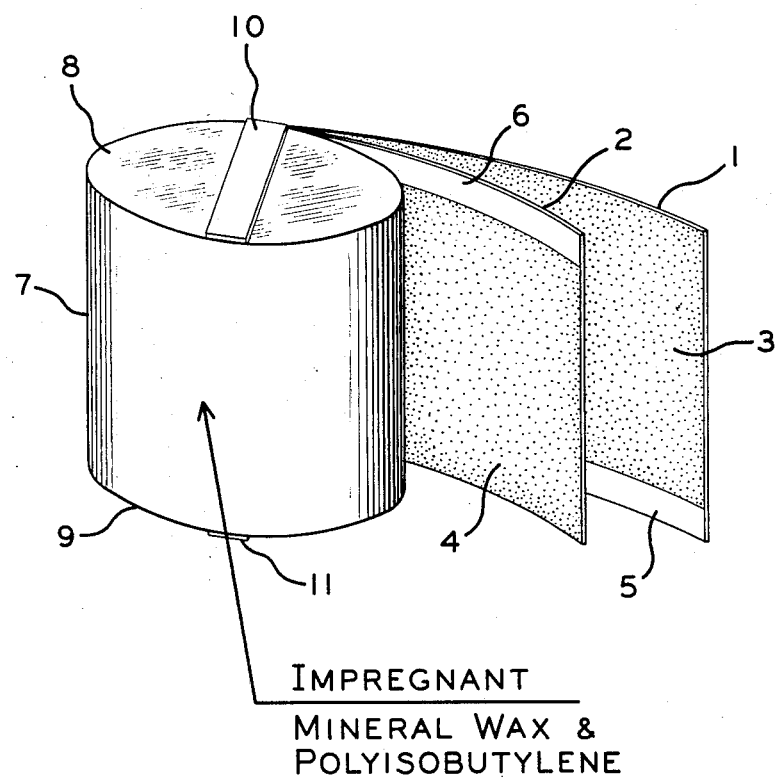

2,870,385
Patented Jan. 20, 1959

2,870,385

IMPREGNATED ELECTRICAL CAPACITORS

Livingston L. Rice, Walter C. Lamphier, and Paul H. Netherwood, Williamstown, Mass., assignors to Sprague Electric Company, North Adams, Mass., a corporation of Massachusetts Application February 2, 1956, Serial No. 563,134

3 Claims. (Cl. 317—258)

This invention relates to impregnated electrical capacitors and more particularly to capacitors impregnated with a substance which at ordinary operating temperatures is a solid.

Present day capacitors have become greatly refined in their electrical characteristics to meet the continual demands of the electronic industry. Further, electronic circuits are no longer only operated at 25 to 65° C., but now are subjected to extremes of depressed and elevated operational temperatures. Thus, an electronic component, such as a capacitor, must not only have exceptional life under the imposed operating conditions, but must exhibit minor changes in capacitance between depressed operational temperatures such as —55° C. and elevated operational temperatures of 105 to 125° C. Previously known devices, which meet this requirement of minor capacitance change, suffer from one or more other disadvantages, such as high power factor, short operational life, low dielectric strength, etc.

In metallized paper capacitors intended for use under conditions in which liquid impregnants are not desirable, solid impregnants normally would be used. However, disadvantages of these solid impregnants become apparent. After prolonged operation of such units at elevated temperatures, the lacquer and/or metal layer is interrupted by the action of the impregnant. This lacquer layer forms the intermediate strata between the paper and the deposited metal electrode, functioning to prevent metal penetration into the primary dielectric. The interruption phenomenon becomes apparent through a steady decrease of capacitance concurrent with increasing power factor until the unit is ineffective as a capacitor. This phenomenon appears to be common to all of the presently known impregnant systems. A further factor in the degradation of the metallized type units is the product occurring during the self-healing operation; a small but definite decomposition of the dielectric adjacent to the self-healed area occurs, resulting in the formation of ionically conductive decomposition products.

It is an object of this invention to overcome the foregoing and related disadvantages. It is a further object of this invention to produce an electrical capacitor operable over an extremely wide temperature range which exhibits minor changes in capacitance over this entire range. It is a still further object of this invention to produce a metallized dielectric capacitor operable for long periods at elevated temperatures. These and other objects of this invention will become apparent from the following specification and appended claims, and by reference to the appending drawing.

These objects have been attained in accordance with the present invention by the production of a capacitor comprising a pair of electrodes separated by a porous dielectric spacer impregnated with a mixture of an unsaturated linear polymer of the polyisobutylene type and a long chain paraffin of molecular weight greater than 600.

In a more restricted sense, these objects have been attained by the production of a capacitor comprising a pair of electrodes separated by a paper spacer fully impregnated with a mixture of an unsaturated linear polymer and a long chain saturated hydrocarbon wax having a melting point of from 190 to 195° F.

In the preferred embodiment, these objects have been achieved by a capacitor comprising at least two metallized lacquered papers fully impregnated with a mixture of an unsaturated linear polymer of a major amount of monoolefins and a minor amount of diolefins, said polymer having a molecular weight of between 1200 and 4200, and a highly refined microcrystalline mineral wax having a melting point of from 190 to 195° F. and a crystallinity index of about 140.

It has been proposed to use as an impregnant as unsaturated linear polymer of a major amount of monoolefins and a minor amount of diolefins, which polymer has a molecular weight of from 1200 to 4200. This synthetic oil which is substantially polyisobutylene with a minor amount of diolefins has remarkable electrical characteristics in that the temperature coefficient of dielectric constant is quite uniform over the temperature range of from —55° to temperatures in excess of 125° C. When utilized within a capacitor such a unit has a temperature coefficient of capacity which is quite exceptional over the entire operating temperature range of from —55° C. to at least 125° C. However, for certain applications this impregnant is deficient, particularly as an impregnant for metallized paper capacitors, because it suffers from the disadvantage that units operated at temperatures in excess of 100° C. suffer a continual decrease in capacitance and an increase in power factor. For such an application, it thus became necessary to use an impregnant which exhibited the capacity stability of the polyisobutylene, but did not suffer the high temperature defect. A high melting point (190° to 195° F.) microcrystalline mineral wax, having a crystallinity index of 140, was evaluated for purposes of obtaining a replacement. Although it exhibited a reasonably small deviation from room temperature capacity at lower temperatures, the rather severe contraction this wax underwent upon going from the liquid to the solid phase manifested substantial changes in capacity at elevated temperatures. Thus, for applications in excess of 85° C. to 90° C., the evaluated mineral wax left much to be desired, because of the capacity change and also from a fault common to impregnants, the interruption of the metallized layer.

Although the reason is not completely understood, it has now been found that the incorporation of a minor amount of the polyisobutylene impregnant into the high melting point mineral wax yielded a component of exceptional constancy of capacity over the temperature range of from —65° C. to +105° C. with excellent leakage resistance and decrease in capacitance of less than 2% after operation for periods in excess of 1000 hours at 105° C. It is believed that the presence of the unsaturated polyisobutylene serves to inhibit the deleterious effects of the degradation products occurring upon self-healing and, further, for some reason which we cannot explain, avoids the dissolution of the lacquer coat by the major substituent and/or materially decreases the property of the primary impregnant of disturbing the metallized layer.

Numerous attempts have been made to classify the various mineral waxes obtained from petroleum. One typical technique is to base the grouping on the crystalline structure—paraffin, semi-microcrystalline, microcrystalline—which was correlated to the "crystallity index." This "index" is directly related to the total contraction undergone by the wax in transition from the liquid to the solid phase (see Kimsel et al., Industrial and Engineering Chemistry (Anal.), 17, 152–6). The highly refined microcrystalline mineral wax, forming a part of the preferred impregnant, has a melting point of from 190° F. to 195° F. with a crystallinity index of 140. It is a hard, non-tacky saturated aliphatic hydrocarbon, primarily octatetracontane—molecular weight of 618—having a specific gravity of 60° F. of 0.92–0.94 with a penetration value (ASTM D5–25) of 217. Coming within the broad scope of this invention are long chain hydrocarbons of microcrystalline structure of chain length equal to or greater than tetra tetracontane ($C_{44}H_{90}$) including pentacontane ($C_{50}H_{102}$), tetra pentacontane ($C_{54}H_{110}$), hexacontane ($C_{60}H_{122}$), dohexacontane ($C_{62}H_{126}$), tetra hexancontane ($C_{64}H_{130}$) and heptacontane ($C_{70}H_{142}$). It has been found that the use of a long chain saturated aliphatic hydrocarbon of chain length less than the tetra tetracontane ($C_{44}H_{90}$) with the polyisobutylene results in much decreased life as well as greater variation in capacitance over the temperature range of −55° C. to 105° C. Thus the shorter length hydrocarbons having a melting point below 188° F. are not within the scope of the invention.

The liquid unsaturated interpolymer forming the other portion of the impregnant is polyisobutylene with about 0.5 to about 10% diolefins by weight, the average molecular weight of the polymer being 1200 to 4200 with an iodine number of from 35 to 50 determined by Wijs' method. Polymerization of a mixture containing a major amount of olefins and a minor amount of diolefins at low or moderate temperatures in the presence of boron trifluoride, aluminum chloride and other halide catalysts results in an impregnant of unique dielectric properties. Although isobutylene is the preferred material, the impregnant within the scope of this invention can be produced with normal and isomeric alkylenes having less than twelve carbon atoms such as ethylene, propylene, amylene, etc. Together with the olefins mentioned above, a minor amount (.5% to 10%) of a diolefin is present in the polymerization mixture. Among the suitable diolefins are butadiene-1,3; butadiene-1,2; beta methyl butadiene-1,3; di-isopropenyl; pentadiene-1,4; hexadiene-1,5; octadiene-1,4; etc.

As a representative example of the process for producing a polymer having the novel electrical characteristics mentioned, the following mixture was subjected to polymerization in the presence of boron trifluoride, and a small amount of finely ground alumina:

| | Percent |
|---|---|
| Alkanes | 58 |
| Propylene | 6 |
| Iso-butylene | 26 |
| n-Butene | 4 |
| Hexadiene-1,5 | 1 |
| Alpha-methylbutadiene-1,3 | 1 |
| Higher olefins | 4 |

The mixture was agitated in a closed chamber and held at a temperature between 30° C. and 60° C. by means of cooling coils for a period of two hours. The top layer was decanted from the tarry residue and the alkanes and unpolymerized olefins distilled off, leaving a very viscous, slightly amber oil.

After refining by filtration over fuller's earth, the viscous oil was found to have a solidification point below −40°, an iodine number of 41.5 and a poor viscosity index, that is a viscosity which undergoes rapid changes with changes in temperature. The average molecular weight of the interpolymer was about 3100.

An apparatus embodying the impregnant of the invention is shown in the accompanying drawing which is a perspective view of a metallized paper capacitor partly rolled.

The capacitor shown in this drawing is made up of two papers 1, 2 each having a coating 3, 4 of a suitable metal, such as zinc, on its lacquered face. Margins 5, 6 extending the entire length of each of these sheets are left free of deposited metal. The two sheets are superimposed with metallized faces each facing the same direction and with their metal free margins on opposite edges and are convolutely wound to form the rolled section 7. Spray terminals 8 and 9 are formed on the opposite edges of the wound unit by spraying on with a coating of a low melting metal, such as lead-tin solder, in contact with the respective exposed metallized edge. The lead wires 10 and 11 are connected to the sprayed terminals 8 and 9, the unit positioned within a container—metal, paper or resin—and thereafter impregnated with the polyisobutylene-long chain olefin composition described above.

A very suitable impregnating mixture according to the present invention is made up of from about 10% to about 50% by weight of the unsaturated linear interpolymer set forth above, said polymer having an average molecular weight of 3100, and from about 90% to about 50% by weight of a high melting point microcrystalline wax having a crystallinity index of about 140. The preferred composition is about 30% of the unsaturated polymer and about 70% of the microcrystalline wax. This preferred composition is prepared by mixing the ingredients together at a temperature above the melting point of the mineral wax, 110° C. to 125° C., until an apparently homogeneous system is obtained. The mixture or dispersion is thereafter impregnated into the units by conventional impregnation techniques at a temperature of 105 to 110° C. With the above preferred composition as the impregnant in a metallized paper capacitor, the variation in capacitance after 1000 hours at 105° C. is less than 2% in contrast to values of 10 to 20% exhibited by capacitors subjected to identical operation with an impregnant of the pure mineral wax.

A further suitable composition in equal amounts by weight of an interpolymer of 99.5% by weight isobutylene and 0.5% by weight of equal amounts of hexadiene 1,5 and alpha-methyl butadiene 1,3, having an average molecular weight of about 1200 and Cleveland flash point of 380° F., and the microcrystalline mineral wax having a melting point of about 190° F. This composition, when suitably prepared as discussed above, after impregnation in a metal foil-paper spacer capacitor exhibited a decrease in capacitance at −55° C. of less than 4% and a variation in capacity at 71° C. of less than 2% from that of room temperature.

The capacitor housing for units that must be operational over an extended range, for example, −55° C. to 105° C. is important particularly if the hermetically sealed requirement obtains. A non-conventional housing has been found exceptional for such applications and serves as an excellent vehicle for the capacitor impregnated with the dielectric of the invention. This housing is of an annular construction consisting essentially of two cylinders, generally of an insulator material, one positioned within the other. The inner cylinder serves a further function as the mandrel support for the convolutely wound capacitor structure. The cylinders are of any conventional dielectric material including resins as polyethylene terephthalate, polystyrene, polytetrafluoro ethylene, phenol formaldehyde, etc., paper, ceramic, glass and may be also of a metal where exceptional hermetic sealing is desired. The open ends wherein the capacitor leads extend as designed is sealed with a resin including filled phenol formaldehyde and epoxy types. For illustrative purposes the housing will be described in its preferred form for a hermetic sealed unit exceptionally resistant to thermal shock. The inner cylinder of brass having an inner diameter of 7/16 inch and 2 inch length with 1/8 inch wall thickness serves as the mandrel support onto which a kraft paper-aluminum foil tab lead capacitor is convolutely wound. Five initial turns of paper are wound about the mandrel to provide insulation prior to winding of the capacitor proper. Tab leads extend from their respective foils at opposed ends and are welded to conventional lead wires. The capacitor can be of course multiple in nature with or without a common electrode, all of which constructions are known to the art. The outer cylinder also of brass is 2 inches long and has an outer diameter of 1.25 inches. This outer cylinder is assembled over the inner cylinder and wound capacitor. The ends of the casing are each filled with a silica powder filler (30% by weight) epoxy resin which resin type is well known to the art, some being disclosed in the W. J. Marmion article "Epoxide Resins" in Research, September 1954, pp. 351–355, and the E. S. Narracott article, "Application of Some Epoxide Resins in the Plastics Industry" in British Plastics, October 1951, pp. 341–345. Annular ceramic discs (inner diameter of 5/8 inch and outer diameter of 1 1/16 inches) each having a slotted portion extending inwardly about 3/16 inch are imposed individually at each end seal into contact with the resin. The respective lead wire is positioned in the slot of the ceramic disc at each end. Thereafter the end seal is subjected to cure at about 250° F. for 2 hours. Thereafter the capacitor assembly is vacuum impregnated with the dielectric of the invention through a small opening in the outer cylinder which is subsequently sealed by conventional solder techniques. The inclusion of the disc materially improves the resistance of the assembly to the ravages of thermal shock and is exceptional in retention of the hermetic seal. The annular construction of the container has the further advantage of providing a volume within the inner cylinder for positioning adjacent components as resistors, diodes, vacuum tubes, transistors, etc.

For special applications where extremely long life is desired, both at elevated temperature and normal temperature operations, an inhibitor is added to the composition in small percentages. A representative inhibitor is tertiary butyl anthraquinone in concentrations of 0.5% to 3%.

As many apparently widely different embodiments of this invention may be made without departing from the spirit and scope thereof, it is to be understood that the invention is not limited to the specific embodiments hereof except as defined in the appended claims.

This application forms a continuation-in-part of United States Patent application, Serial No. 458,127, filed September 24, 1954, now abandoned.

What is claimed is:

1. A capacitor comprising a pair of metallized electrodes separated by a porous dielectric spacer impregnated with a mixture of an unsaturated linear interpolymer of isobutylene having from about 0.5% to about 10% by weight of diolefins and a microcrystalline mineral wax having a molecular weight of at least 618, said linear interpolymer constituting from about 50% to about 10% by weight of said mixture.

2. The capacitor of claim 1 in which said wax has a melting point of from 190° to 195° F.

3. A capacitor comprising at least two metallized lacquered papers fully impregnated with a mixture of an unsaturated linear interpolymer of a mixture of monoolefins having less than 12 carbon atoms with from about 0.5 to about 10% of diolefins, said polymer having a molecular weight of between 1200 and 4200, and a highly refined microcrystalline mineral wax having a melting point of from 190° to 195° F. and a crystallinity index of about 140, said interpolymer constituting from about 50% to about 10% by weight of said mixture.

References Cited in the file of this patent

UNITED STATES PATENTS

| | | |
|---|---|---|
| 2,580,050 | Sparks | Dec. 25, 1951 |
| 2,615,955 | McLean | Oct. 28, 1952 |
| 2,711,498 | Robinson | June 21, 1955 |

UNITED STATES PATENT OFFICE

CERTIFICATE OF CORRECTION

Patent No. 2,870,385 January 20, 1959

Livingston L. Rice et al.

It is hereby certified that error appears in the printed specification of the above numbered patent requiring correction and that the said Letters Patent should read as corrected below.

Column 2, line 16, for "as", second occurrence, read -- an --; column 4, line 39, for "composition in" read -- composition is --; column 5, line 13, for "filler" read -- filled --.

Signed and sealed this 16th day of June 1959.

(SEAL)
Attest:

KARL H. AXLINE
Attesting Officer

ROBERT C. WATSON
Commissioner of Patents